United States Patent
Darcy

(10) Patent No.: US 9,248,606 B2
(45) Date of Patent: Feb. 2, 2016

(54) METHOD OF PREPARING A PIPE FOR JOINING TO ANOTHER PIPE

(71) Applicant: Murphy Pipe & Civil IP Pty Ltd, Albion (AU)

(72) Inventor: James Francis Darcy, Bulimba (AU)

(73) Assignee: Murphy Pipe & Civil IP Pty Ltd, Albion (AU)

( * ) Notice: Subject to any disclaimer, the term of this patent is extended or adjusted under 35 U.S.C. 154(b) by 3 days.

(21) Appl. No.: 13/856,494

(22) Filed: Apr. 4, 2013

(65) Prior Publication Data

US 2014/0299258 A1    Oct. 9, 2014

(51) Int. Cl.
*B29C 65/20* (2006.01)
*B29C 65/18* (2006.01)
*B29C 65/78* (2006.01)
*B29C 65/00* (2006.01)
*B26D 3/16* (2006.01)
*B26D 1/26* (2006.01)

(52) U.S. Cl.
CPC . *B29C 65/18* (2013.01); *B26D 3/16* (2013.01); *B26D 3/163* (2013.01); *B26D 3/166* (2013.01); *B29C 65/20* (2013.01); *B29C 65/2092* (2013.01); *B29C 65/7841* (2013.01); *B29C 66/02241* (2013.01); *B29C 66/1142* (2013.01); *B29C 66/5221* (2013.01); *B29C 66/83221* (2013.01); *B26D 1/26* (2013.01); *B29C 66/71* (2013.01); *B29C 66/9261* (2013.01); *B29C 2793/0054* (2013.01); *Y10T 156/1378* (2015.01)

(58) Field of Classification Search
CPC ............... B29C 65/20; B29C 65/2092; B29C 66/02241; B29C 66/1142; B29C 66/5221; B29C 2793/0054; B29D 23/003
USPC ............... 156/257, 258, 304.2, 304.5, 304.6; 285/288.1

See application file for complete search history.

(56) References Cited

U.S. PATENT DOCUMENTS

| | | | | |
|---|---|---|---|---|
| 3,552,265 A | * | 1/1971 | Lucas | 409/145 |
| 3,729,360 A | * | 4/1973 | McElroy | 156/499 |
| 6,994,766 B2 | * | 2/2006 | Temple | 156/257 |

* cited by examiner

*Primary Examiner* — Michael Tolin
(74) *Attorney, Agent, or Firm* — Hodgson Russ LLP

(57) ABSTRACT

A method of preparing a pipe for joining to another pipe, the method including the steps of fixing a cutting tool to one side of a fusion welding machine; fixing a pipe to an other side of the welding machine; moving the cutting tool with respect to the pipe so that the cutting tool engages an internal wall of the pipe to thereby cut the internal wall of the pipe, preparing the pipe for joining to another pipe.

18 Claims, 2 Drawing Sheets

METHOD OF PREPARING A PIPE FOR JOINING TO ANOTHER PIPE

FIELD OF THE INVENTION

This invention relates to a method of joining pipes. In particular, the invention relates to a method of joining plastic pipes that have a varying wall thickness.

BACKGROUND OF THE INVENTION

The advantages provided by underground pipes are well recognized by people in the various industries, such as telecommunication, oil, water and gas. However, the laying of underground pipes can be expensive and time consuming. This is especially the case when the terrain provides substantial landscape obstacles such as undulating ground and rivers, in addition, the client requires the pipes to be buried deep into the ground.

The development of the plough system (known in the industry as the "SpiderPlow, Foeck Plough or Spider Plough") has revolutionized the laying of underground pipe. The plough system consists of a winch vehicle which is attached via a cable to a plough vehicle. The plough system can lay polyethylene pipe very quick in a variety of terrain.

When a pipeline is laid, the outer diameter of the pipe generally does not change. However, the internal diameter of the pipe often changes to increase or decrease the wall thickness of the pipe. The increase in wall thickness of the pipe is usually required when the pipe is likely to encounter increased forces such as when it is located under a road or watercourse.

Polyethylene pipes that are laid using a plough vehicle are often joined using a fast fusion welding machine. Polyethylene pipe that is joined through fusion welding normally creates a butt joint. A butt joint is formed by holding the two sections of pipe rigidly using a two pairs of jaws which form part of the fusion welding machine. The two ends of the pipes are faced to square the ends of the pipes and prepare the pipes for welding. The ends of the pipes are then heated above their melting point using a heating element. The pipes are then pushed together using the jaws which forces the two melted faces of the respective pipes together to fuse into each other and hence form the butt joint.

Fusion welding usually creates a joint that is as strong as or stronger than the parent material and is very reliable when used on pipes that have the same wall thickness. However, fusion welding does not work well with pipes that have different wall thickness. Therefore, when two pipes of a different wall thickness needs to be joined together, a prefabricated, transition section of pipe is often used. The transition section of pipe has two ends of different wall thickness which reflect the wall thickness of each of the pipes that the transition section of pipe is to be joined.

An transition section of pipe is undesirable as the transition section must be preordered and premade and must be ready on-site when needed. Further, the fusion welding of this transition section is time consuming and cumbersome due to the number of welds required.

The reference to any prior art in this specification is not, and should not be taken as, an acknowledgment or any form of suggestion that the prior art forms part of the common general knowledge.

OBJECT OF THE INVENTION

It is an object of the invention to overcome and/or alleviate one or more of the above disadvantages and/or provide the consumer with a useful or commercial choice.

SUMMARY OF THE INVENTION

In one form, although not necessarily the only or broadest form, the invention resides a method of preparing a pipe for joining to another pipe, the method including the steps of:
  fixing a cutting tool to one side of a fusion welding machine;
  fixing a pipe to an other side of the welding machine;
  moving the cutting tool with respect to the pipe so that the cutting tool engages an internal wall of the pipe to thereby cut the internal wall of the pipe, preparing the pipe for joining to another pipe.

The fusion welding machine typically includes at least one jaw on each side of the fusion welding machine. Preferably, the fusion welding machine includes at least two jaws on each side of the welding machine. More preferably, the fusion welding machine includes two jaws located on each side of the welding machine.

Normally the cutting tool is removably fixed to the fusion welding machine. The cutting tool may be removably fixed to the fusion welding machine using at least one jaw of the fusion welding machine. Normally the cutting tool is removably fixed to the fusion welding machine using at least two jaws.

Normally the pipe is removably fixed to the fusion welding machine. The pipe may be removably fixed to the fusion welding machine using at least one jaw of the fusion welding machine. Normally the pipe is removably fixed to the fusion welding machine using at least two jaws.

Usually the jaw or jaws located on one side of the fusion welding machine are able to be moved with respect to the jaws on the other side of the fusion welding machine. A controller of the fusion welding machine is typically used for this purpose.

When the cutting tool and the pipe are mounted to the jaws, the controller may be used to move the cutting tool with respect to the pipe so that the cutting tool engages the internal wall of the pipe to thereby cut the internal wall of the pipe.

The cutting tool may be operated using a hydraulic motor that also operates the fusion welding machine.

In anther form, although not necessarily the only or broadest form, the invention resides a method of joining two pipes together, the method including the steps of:
  fixing a cutting tool to one side of a fusion welding machine;
  fixing a first pipe within the other side of the welding machine;
  moving the cutting tool with respect to the pipe so that the cutting tool engages an internal wall of the pipe to thereby cut the internal wall of the first pipe to make the wall thickness of the first pipe substantially equal to a wall thickness of a second pipe;
  removing the cutting tool from the fusion welding machine;
  fixing the second pipe to the same side of the fusion welding machine as the cutting tool was fixed to;
  heating ends of both the first pipe and the second pipe
  moving the first pipe with respect to the second pipe so that the end of the pipe contact to thereby join the pipes together.

The fusion welding machine typically includes at least one jaw on each side of the fusion welding machine. Preferably, the fusion welding machine includes at least two jaws on each side of the welding machine. More preferably, the fusion welding machine includes two jaws located on each side of the welding machine.

Normally the cutting tool is removably fixed to the fusion welding machine. The cutting tool may be removably fixed to the fusion welding machine using at least one jaw of the fusion welding machine. Normally the cutting tool is removably fixed to the fusion welding machine using at least two jaws.

Normally the first pipe is removably fixed to the fusion welding machine. The first pipe may be removably fixed to the fusion welding machine using at least one jaw of the fusion welding machine. Normally the first pipe is removably fixed to the fusion welding machine using at least two jaws.

Normally the second pipe is removably fixed to the fusion welding machine. The second pipe may be removably fixed to the fusion welding machine using at least one jaw of the fusion welding machine. Normally the second pipe is removably fixed to the fusion welding machine using at least two jaws.

Usually the jaw or jaws located on one side of the fusion welding machine are able to be moved with respect to the jaw or jaws on the other side of the fusion welding machine. A controller of the fusion welding machine is typically used for this purpose.

When the cutting tool and the first pipe are mounted to the jaws, the controller may be used to move the cutting tool with respect to the first pipe so that the cutting tool engages the internal wall of the first pipe to thereby cut the internal wall of the pipe.

The heating of the ends of the pipe may be achieved using one or more heating elements. The one or more heating elements normally form part of the fusion welding machine.

Both the ends of the first pipe and the second pipe may be faced prior to the pipes being joined together. Normally the ends of the first pipe and the second pipe are faced before the end of the first pipe and the second pipe are heated. A facing tool may be used to face the pipes. The facing tool normally forms part of the fusion welding machine.

In yet another form, the invention resides in a cutting tool that can be removable fixed to a fusion welding machine, the cutting tool comprising:
 a rotating head having a cutting blade;
 a drive for driving the rotating head; and
 a body that is engageable by at least one jaw of a fusion welding maching.

In still yet another form, the invention resides in pipe cutting apparatus, the pipe cutting apparatus comprising
 a fusion welding machine; and
 a cutting tool fixed to one side of a fusion welding machine.

The cutting apparatus may a pipe which is fixed to an opposite side of the welding machine to the cutting tool.

The fusion welding machine may include at least one jaw. Preferably, fusion welding machine includes at least one pair of jaws. Normally, there are two pairs of jaws. The two pairs of jaws may be moved with respect to each. Each jaw may have an internal recess. The recess may extend the entire length of the jaw.

A controller may be used to control the movement of the jaws with respect to each other. The controller may also control the opening and closing of the each of the jaws.

The cutting tool may have a rotating head having a cutting blade, a drive for driving the rotating head and a body that is engageable by at least one jaw of a fusion welding machine.

The drive may be a motor. Preferably the motor is a hydraulic or pneumatic motor.

The body may be shaped so that at least one jaw can engage with the body. Preferably, the body engages with the internal recess of a jaw. More preferably, the body includes a disc that enages with a recess of a jaw. Still more preferably, the body includes two disc which engage with two respective recess of two respective jaws.

Further forms and features of the present invention will become apparent from the following detailed description.

BRIEF DESCRIPTION OF THE DRAWINGS

An embodiment, by way of example only, will now be described with reference to the accompanying drawings in which.

DETAILED DESCRIPTION OF THE PREFERRED EMBODIMENT

Figure 1:
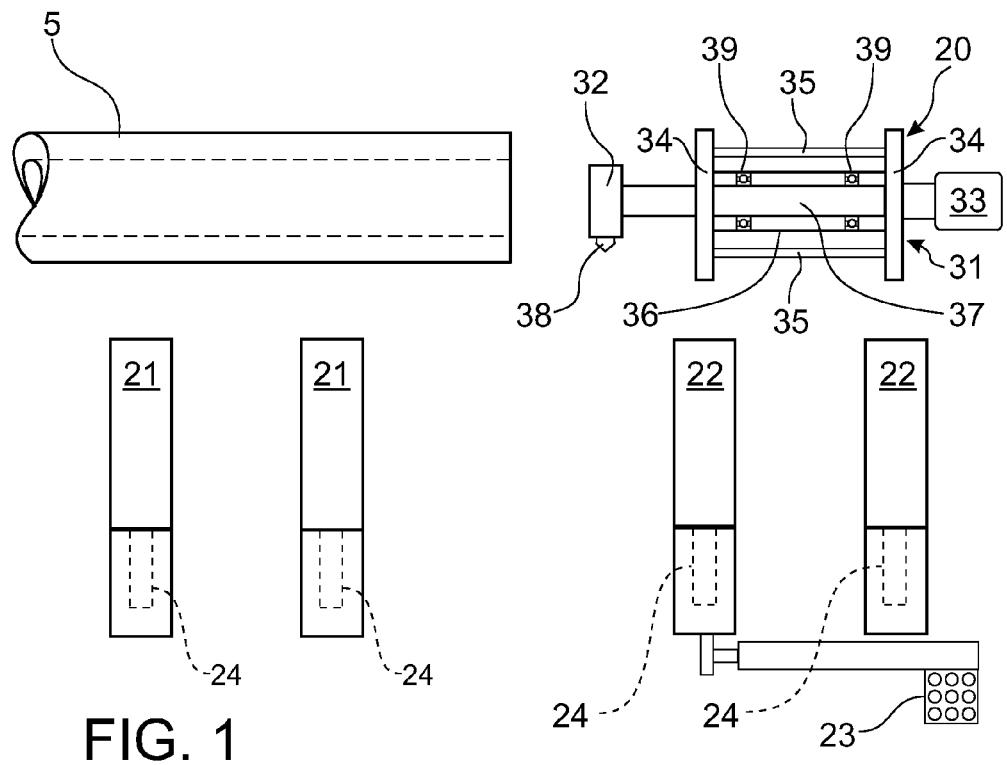
FIGS. 1-6 are schematic views of how to join pipes at different wall thicknesses joined together.

FIG. 1-6 show a cutting apparatus 10 that is used to reduce the size of an internal diameter of a polyethylene pipe. The cutting apparatus includes a fusion welding machine 20 and a cutting tool 30.

The fusion welding machine 20 represented in the FIGS is well known in the art and recognisable by people skilled in the art. The fusion welding machine 20 has two pairs of jaws 21 and 22. Each pair of jaws 21 and 22 is adapted to engage and hold a length of pipe to enable the pipe to be fused together. The pairs of jaws 21 and 22 are movable with respect to each other. A controller 23 is used for this purpose. Each jaw 21 and 22 has internal recess 24 which extends along the jaw.

The cutting tool 30 includes a body 31, rotating head 32 and a hydraulic motor 33. The body 31 is formed from two spaced apart discs 34 which are internally connected by a four peripheral struts 35 and a central tube 36. The hydraulic motor 33 is centrally mounted to one of the discs 34. The rotating head is connected to the hydraulic motor 33 via a shaft 37. The rotating lead 32 has a cutting blade 38. The shaft passes through the central tube 36 and is supported by a number of linear bearings 39. The cutting blade 38 can be changed out to cater for different size internal diameters.

In order to prepare a first pipe 5 that has an internal diameter smaller than a second pipe 6 to which the first pipe 5 is to be joined (ie the first pipe 5 has a large wall thickness than the second pipe), the first pipe 5 is placed within a pair of jaws 21 on one side of the fusion welding machine 20. The jaws 21 are moved from an open position to a closed position to fix the first pipe to the fusion welding machine.

Figure 2:
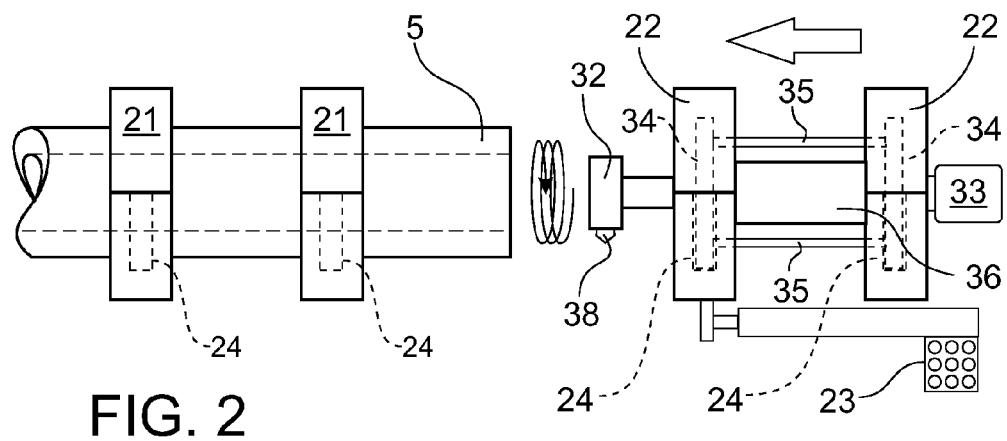

The cutting tool 30 is placed within the other pair of jaws 22 of the fusion welding machine as shown in FIG. 2. The discs of the body 31 of the cutting tool 30 are sized so that they locate within the respective 34 internal recess 24 of the jaws. The jaws 22 are then moved from an open position to a closed position to fix the cutting tool 30 to the fusion welding machine. The hydraulic motor 37 of the cutting tool 30 is connected to a source of hydraulic fluid (not shown). Typically the source of hydraulic fluid is the same source of hydraulic fluid that is used to operate fusion welding machine 20. By placing the cutting tool 30 into the fusion welding machine 20, the fusion welding machine 20 is transformed into the cutting apparatus 10.

Figure 3:
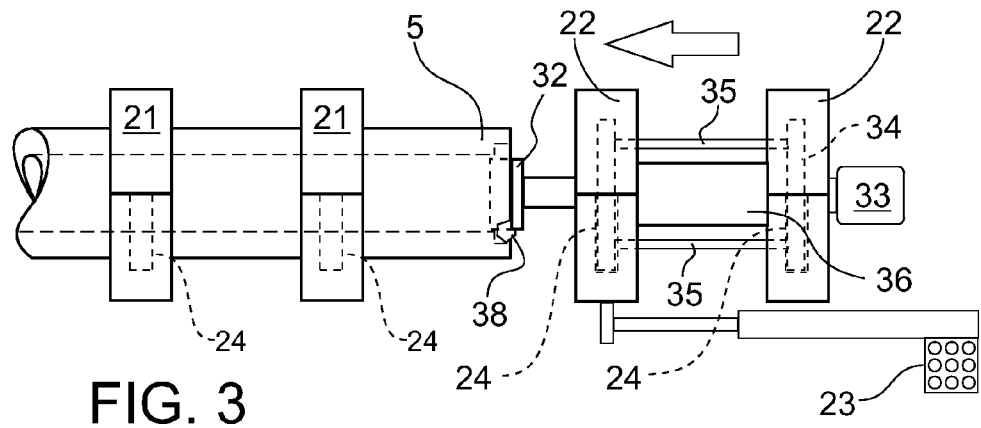
Figure 4:
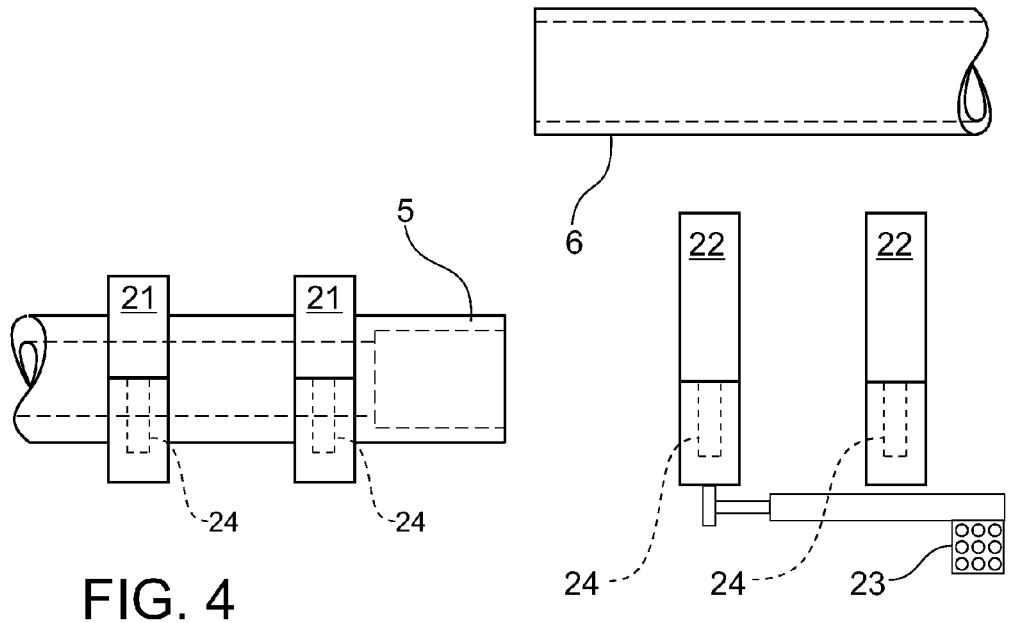

Once the first pipe 5 and the cutting tool 30 are fastened to the fusion welding machine, the hydraulic motor is operated causing the rotating head 32 to rotate subsequently causing the cutting blade 38 to also rotate. The controller 23 is then used to move the jaws 22 that hold the cutting tool toward the first pipe 5 as shown in FIG. 3. Accordingly, the cutting blade 38 cuts the end wall and the internal wall of the first pipe 5 as the cutting blade moves inwardly. When the cutting blade 38 has cut the first pipe 5 to a predetermined depth, the rotating head 32 is removed from the first pipe 5 using the controller 23. The cutting tool 30 is then removed from the fusion welding machine 20 by moving the jaws 22 from a closed position to an open position as shown in FIG. 4.

Figure 5:
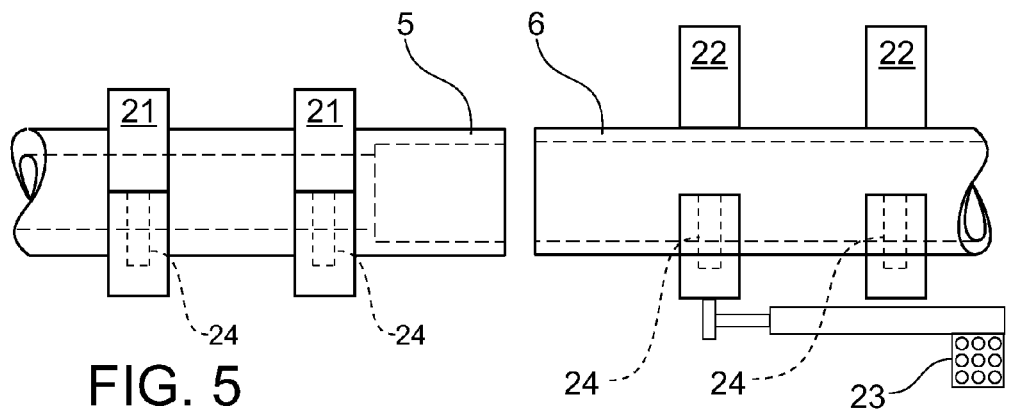
Figure 6:
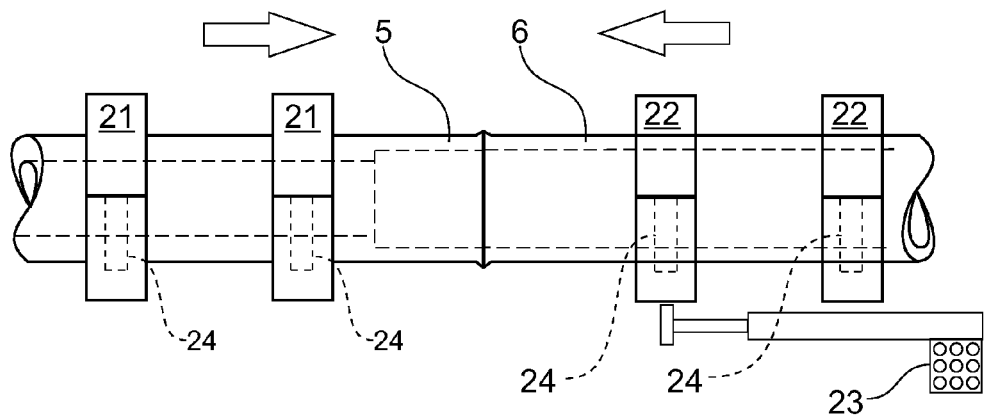

In order to join the first pipe 5 which has been cut to the second pipe 6, the second pipe 6 fixed within the pair of jaws 22. Both ends of the pipes 5 and 6 are then faced using a facing tool (not shown) which forms part of the fusion welding machine as shown in FIG. 5. After the pipes 5 and 6 have been faced, heating elements (not shown) which also form part of the fusion welding machine heat the end of the pipes. After heating of the end, the ends of each of the pipes are bought into contact using the controller 23 as shown in FIG. 6. Once the pipes have cooled they are released from their respective pairs of jaws ready to be laid.

In this specification, the terms "comprise", "comprises", "comprising" or similar terms are intended to mean a non-exclusive inclusion, such that a system, method or apparatus that comprises a list of elements does not include those elements solely, but may well include other elements not listed.

The reference to any prior art in this specification is not, and should not be taken as, an acknowledgement or any form of suggestion that the prior art forms part of the common general knowledge.

It should be appreciated that various other changes modifications may be made to the embodiment described with that departed from the spiritual scope of the invention.

The invention claimed is:

1. A method of preparing a pipe for joining to another pipe, the method including the steps of:
    fixing a cutting tool to a second side of a fusion welding machine;
    fixing a first pipe to a first side of the fusion welding machine such that a longitudinal axis extending through the first pipe extends through the cutting tool; and
    moving the cutting tool along the longitudinal axis so that the cutting tool engages an internal wall of the first pipe to thereby cut the internal wall of the first pipe and reduce a wall thickness of the first pipe, preparing the first pipe for joining to a second pipe;
    wherein the fusion welding machine comprises:
    a holder for fixing the second pipe to the second side of the fusion welding machine;
    a heater for heating ends of both the first pipe and the second pipe; and
    a drive for moving the first pipe with respect to the second pipe.

2. The method of claim 1 wherein the fusion welding machine includes at least one jaw on the first side of the fusion welding machine and the holder includes at least one jaw on the second side of the fusion welding machine.

3. The method of claim 2, further comprising:
    mounting the cutting tool and the first pipe to respective jaws, and using a controller to move the cutting tool with respect to the first pipe so that the cutting tool engages the internal wall of the first pipe to thereby cut the internal wall of the first pipe.

4. The method of claim 1 wherein the fusion welding machine includes two jaws located on the first side of the fusion welding machine and the holder includes two jaws on the second side of the fusion welding machine.

5. The method of claim 4 wherein the jaws located on the first side of the fusion welding machine are able to be moved with respect to the jaws on the second side of the fusion welding machine.

6. The method of claim 1 wherein the cutting tool is removably fixed to the fusion welding machine.

7. The method of claim 1 wherein the cutting tool is removably fixed to the fusion welding machine using at least two jaws.

8. The method of claim 1 wherein the first pipe is removably fixed to the fusion welding machine.

9. The method of claim 1 wherein the first pipe is removably fixed to the fusion welding machine using at least two jaws.

10. The method of claim 1 wherein the cutting tool is operated using a hydraulic motor that also operates the fusion welding machine.

11. A method of joining two pipes together, the method including the steps of:
    fixing a cutting tool to one side of a fusion welding machine;
    fixing a first pipe to another side of the fusion welding machine;
    moving the cutting tool along a longitudinal axis extending through the first pipe so that the cutting tool engages an internal wall of the first pipe to thereby cut the internal wall of the first pipe to make the wall thickness of the first pipe substantially equal to a wall thickness of a second pipe, the wall thickness of the first pipe initially being different to the wall thickness of the second pipe;
    removing the cutting tool from the fusion welding machine;
    fixing the second pipe to where the cutting tool was fixed to;
    heating ends of both the first pipe and the second pipe; and
    moving the first pipe with respect to the second pipe so that the ends of the pipes contact to thereby join the pipes together.

12. The method of claim 11 wherein the fusion welding machine includes two jaws located on each side of the fusion welding machine.

13. The method of claim 11 wherein the cutting tool is removably fixed to the fusion welding machine.

14. The method of claim 11 wherein the first pipe is removably fixed to the fusion welding machine.

15. The method of claim 11 wherein the second pipe is removably fixed to the fusion welding machine.

16. The method of claim 11, further comprising:
    mounting the cutting tool and the first pipe to respective jaws, and using a controller to move the cutting tool with respect to the first pipe so that the cutting tool engages the internal wall of the first pipe to thereby cut the internal wall of the first pipe.

17. The method of claim 11 wherein an end of the first pipe and an end of second pipe are faced prior to the pipes being joined together.

18. The method of claim 17 wherein the ends of the first pipe and the second pipe are faced before the ends of the first pipe and the second pipe are heated.

* * * * *